(12) United States Patent
Su (10) Patent No.: US 9,810,571 B1
(45) Date of Patent: Nov. 7, 2017

(54) HAND TRUCK WITH A LOADING WEIGHING MECHANISM

(71) Applicant: Chung-Hsiu Su, Kaohsiung (TW)

(72) Inventor: Chung-Hsiu Su, Kaohsiung (TW)

( * ) Notice: Subject to any disclaimer, the term of this patent is extended or adjusted under 35 U.S.C. 154(b) by 0 days.

(21) Appl. No.: 15/379,831

(22) Filed: Dec. 15, 2016

(51) Int. Cl.
| | | |
|---|---|---|
| *B62B 1/10* | (2006.01) | |
| *B62B 1/12* | (2006.01) | |
| *B62B 1/18* | (2006.01) | |
| *B62B 1/20* | (2006.01) | |
| *G01G 1/00* | (2006.01) | |
| *G01G 19/08* | (2006.01) | |
| *B62B 5/00* | (2006.01) | |

(52) U.S. Cl.
CPC .............. *G01G 19/083* (2013.01); *B62B 1/12* (2013.01); *B62B 5/00* (2013.01); *B62B 2203/50* (2013.01); *B62B 2205/30* (2013.01)

(58) Field of Classification Search
CPC .... B62B 1/10; B62B 1/12; B62B 1/18; B62B 1/20; G01G 1/00; G01G 3/00; G01G 7/00
See application file for complete search history.

(56) References Cited

U.S. PATENT DOCUMENTS 5,995,001 A * 11/1999 Wellman ............... B66F 17/003
340/438
8,579,304 B2 * 11/2013 Setzer, Sr. ................. B66F 9/08
280/47.17

\* cited by examiner

*Primary Examiner* — Bryan Evans
(74) *Attorney, Agent, or Firm* — Muncy, Geissler, Olds & Lowe, P.C.

(57) ABSTRACT

A hand truck includes a truck frame, a toe plate coupled with the truck frame and having a loading surface which is disposed to extend forwardly of and transverse to the truck frame for carrying objects thereon, and a load measuring assembly disposed on the truck frame adjacent to the toe plate and spaced apart from the loading surface to measure weight of the objects set on the loading surface. The load measuring assembly includes a force measuring unit disposed on the truck frame to receive and measure an upward force, and a force transferring unit interconnecting the toe plate and the force measuring unit to transfer the weight of the objects as the upward force to the force measuring unit.

4 Claims, 8 Drawing Sheets

HAND TRUCK WITH A LOADING WEIGHING MECHANISM

FIELD

The disclosure relates to a hand truck, and more particularly to a hand truck with a loading weighing mechanism.

BACKGROUND

Figure 1:
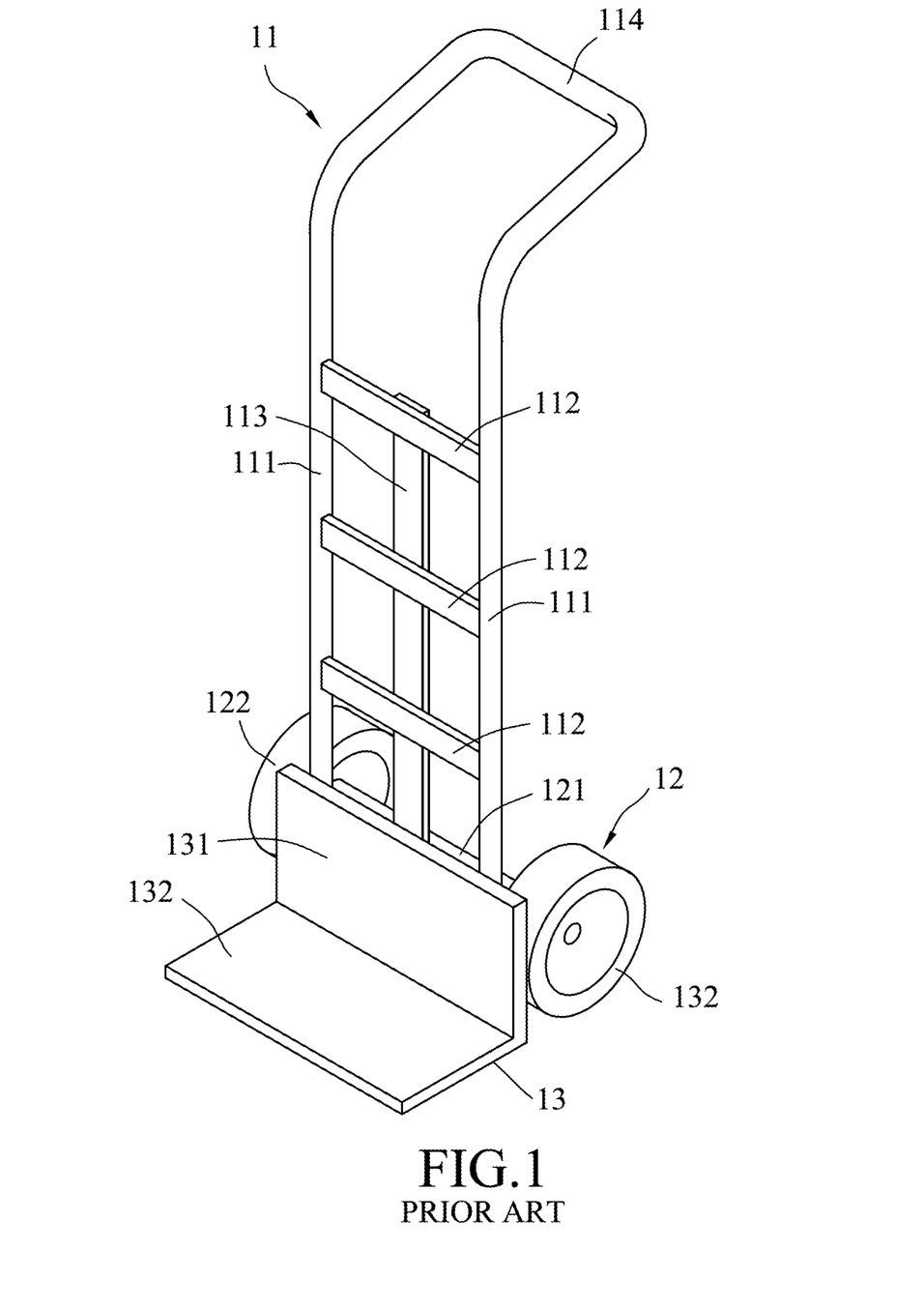
FIG. 1 is a perspective view of a conventional hand truck.

Referring to FIG. 1, a conventional hand truck includes a truck frame 11, as well as a toe plate 13 and a wheel unit 12 disposed on a lower end of the truck frame 11 at front and rear sides, respectively. The truck frame 11 has two upright columns 111, a plurality of crossbars 112 interconnecting the upright columns 111, a mounting plate 113 interconnecting the crossbars 112, and a U-shaped hand gripping rod 114 interconnecting upper ends of the upright columns 111. The wheel unit 12 has a wheel axle 121 connected to the mounting plate 113 and extending in a left-and-right direction for pivotably connecting two wheels 122 at two ends. The toe plate 13, which is of an L-shape, has vertical and horizontal plate portions 131, 132. Several stacked objects (not shown) can be set on the horizontal plate portion 132, and the truck frame 11 can be tilted to be pushed or pulled by an operator. It is desired to provide a weighing device to readily measure the weight of the stacked objects loaded on the hand truck without the need to remove the objects from the hand truck.

SUMMARY

Therefore, an object of the disclosure is to provide a hand truck that has a weighing mechanism to measure weight of a load when the load is set thereon.

According to the disclosure, the hand truck includes a truck frame extending in an upright direction to have upper and lower frame ends, a toe plate having a loading surface which is disposed to extend forwardly of and transverse to the truck frame for carrying objects thereon, and a load measuring assembly disposed on the truck frame adjacent to the toe plate and spaced apart from the loading surface to measure weight of the objects set on the loading surface. The toe plate is pivotably connected to the lower frame end of the truck frame about a pivot axis to be turnable relative to the truck frame between a folded position, where the loading surface extends parallel to the truck frame, and an unfolded position, where the loading surface extends transverse to the truck frame and faces upwardly. The load measuring assembly includes a force measuring unit disposed on the truck frame to receive and measure a force in the upright direction, and a force transferring unit interconnecting the toe plate and the force measuring unit to transfer the weight of the objects as the force to the force measuring unit. The load measuring assembly includes a force measuring unit disposed on the truck frame to receive and measure a force in the upright direction, and a force transferring unit interconnecting the toe plate and the force measuring unit to transfer the weight of the objects as the force to the force measuring unit. The force transferring unit includes a force transmitting portion which extends transverse to the loading surface to terminate at a mounting rim, and a contact portion which is mounted on the mounting rim. The loading surface and the force transmitting portion are disposed at two opposite sides of the pivot axis such that, when the toe plate is in the folded position, the mounting rim of the force transmitting portion faces rearwardly to bring the contact portion remote from the force measuring unit, and such that, when the toe plate is in the unfolded position, the mounting rim faces upwardly to bring the contact portion into contact with the force measuring unit, and the weight of the objects set on the loading surface causes an upward movement of the force transmitting portion and the contact portion to apply an upward force to the force measuring unit.

BRIEF DESCRIPTION OF THE DRAWINGS

Other features and advantages of the disclosure will become apparent in the following detailed description of the embodiment with reference to the accompanying drawings, of which.

DETAILED DESCRIPTION

Figure 2:
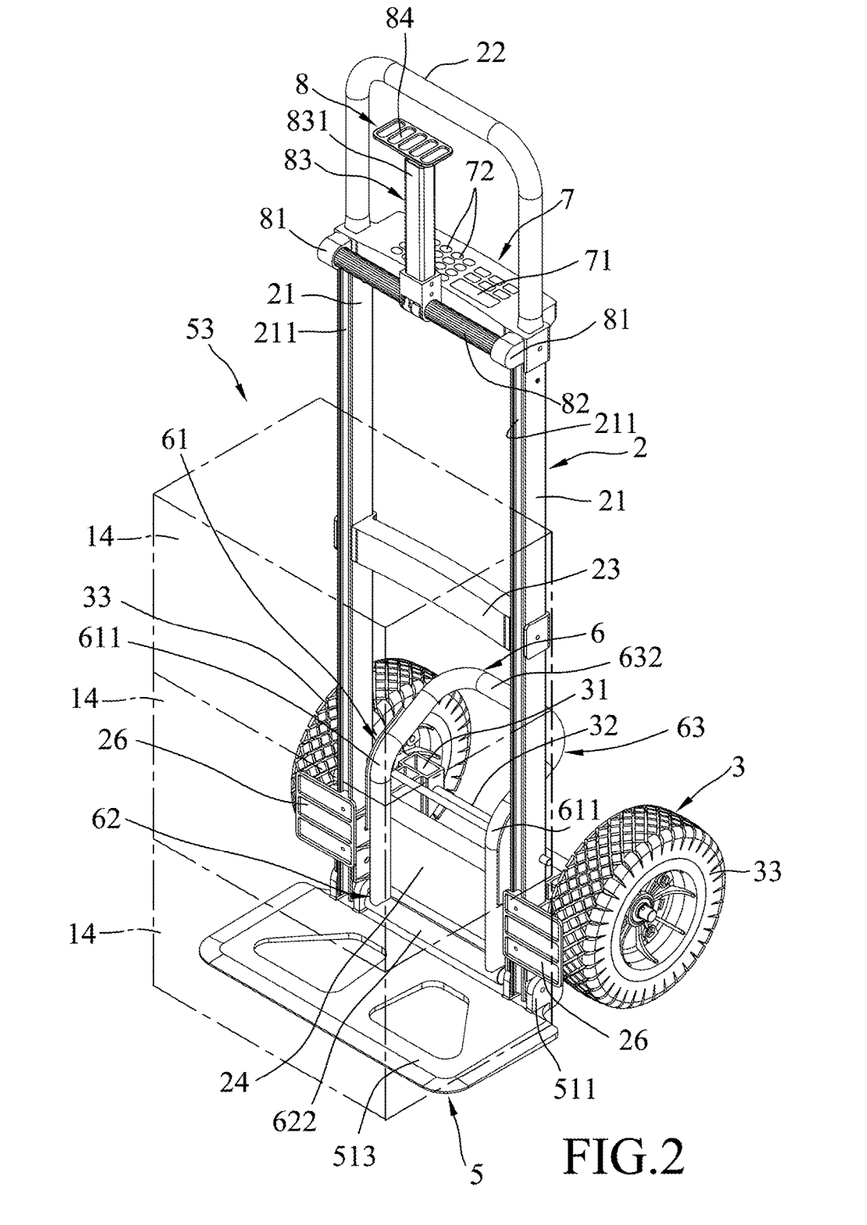
FIG. 2 is a perspective view illustrating that an embodiment of a hand truck according to the disclosure is in a state where a toe plate is in an unfolded position.
Figure 3:
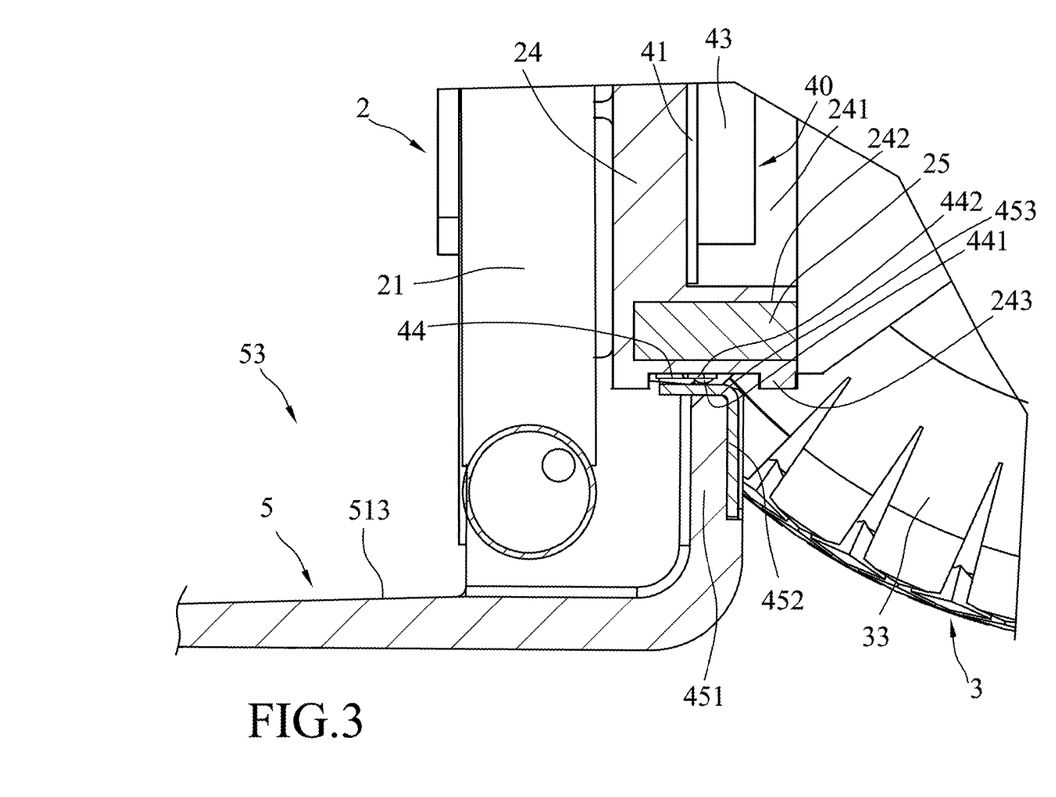
FIG. 3 is a fragmentary sectional view illustrating the toe plate in the unfolded position.
Figure 4:
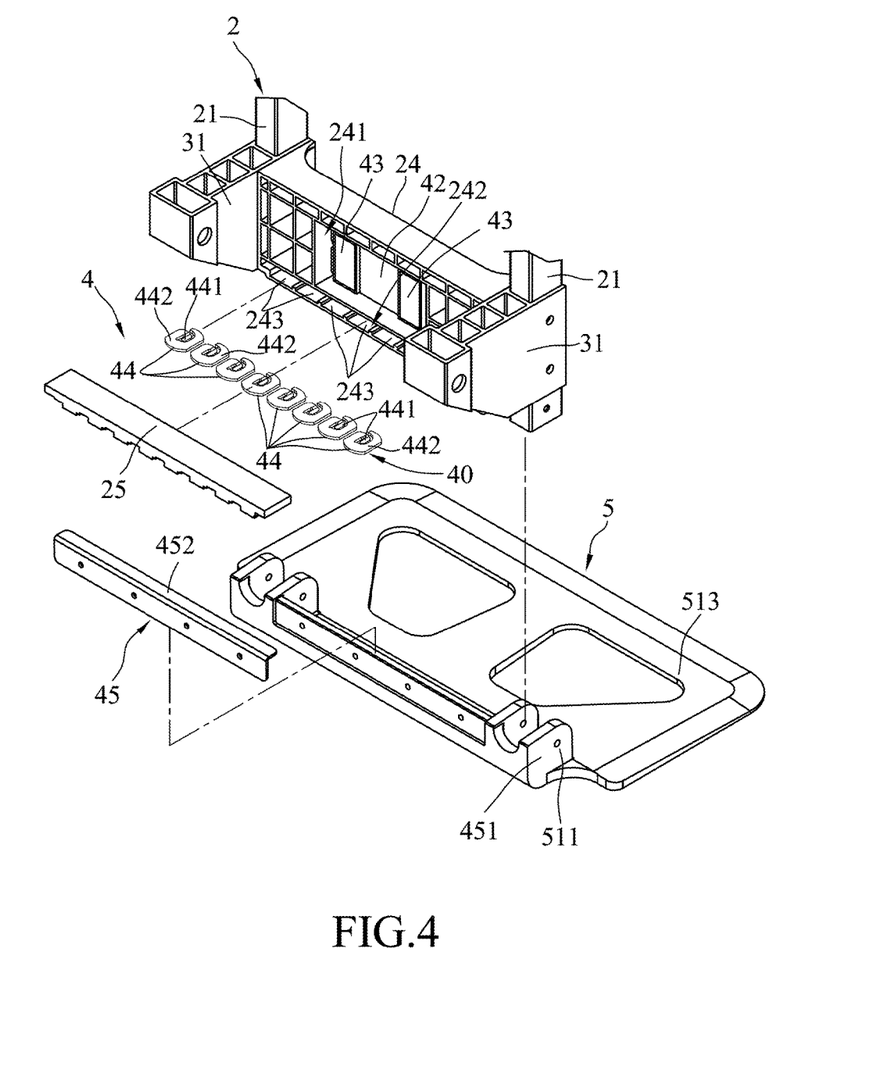
FIG. 4 is a fragmentary, exploded perspective view illustrating the toe plate and a load measuring unit according to this embodiment.

Referring to FIGS. 2 to 4, an embodiment of a hand truck according to this disclosure includes a truck frame 2 extending in an upright direction to have upper and lower frame ends, a wheel unit 3 connected with the lower frame end of the truck frame 2, a toe plate 5 connected with the lower frame end of the truck frame 2 and disposed forwardly of the wheel unit 3, a load measuring assembly 4 disposed on the lower frame end of the truck frame 2 adjacent to the toe plate 5, an unloading unit 6 pivotably connected with the truck frame 2, a computing unit 7 disposed on the truck frame 2 adjacent to the upper frame end, and a retaining unit 8 slidably disposed on the truck frame 2.

The truck frame 2 includes two rails 21 extending in the upright direction to have upper and lower frame ends and spaced apart from each other in a left-and-right direction, a U-shaped rod 22 connected to the upper frame ends of the rails 21, a crossbar 23 interconnecting middles of the rails 21, a base seat 24 disposed between the lower frame ends of the rails 21, a shield 25 disposed on the base seat 24, and two guarding plates 26 disposed at front sides of the rails 21. Each rail 21 defines a sliding groove 211. The base seat 24 has a central recess 241, an elongated slot 242 extending in the left-and-right direction, and a plurality of bores 243 extending to communicate with the elongated slot 242. The shield 25 is disposed in the elongated slot 242 above the bores 243. The guarding plates 26 extend outwardly of the respective rails 21 to be disposed forwardly of the wheel unit 3.

The wheel unit 3 includes two wheel mounts 31 respectively sleeved on the rails 21 and disposed outwardly of the base seat 24, and a wheel axle 32 interconnecting the wheel mounts 31 and extending outwardly for mounting two wheels 33.

Figure 6:
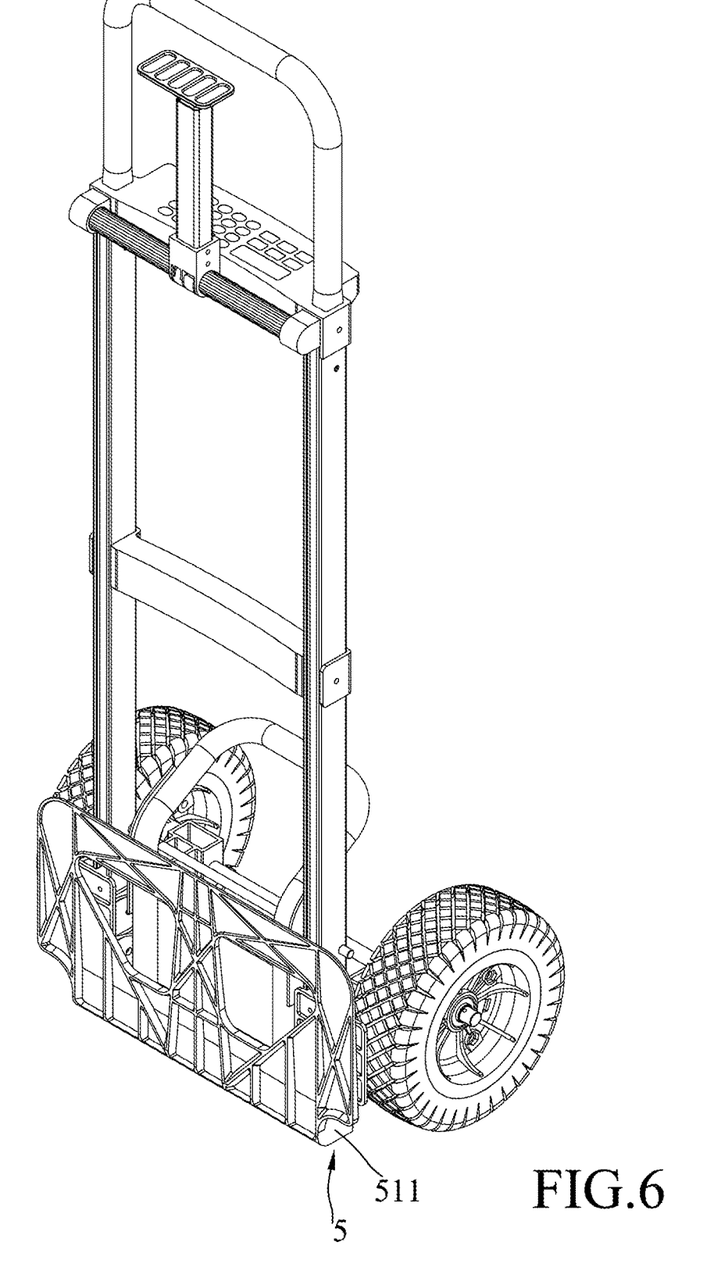
FIG. 6 is a perspective view illustrating a state where the toe plate is in a folded position.

The toe plate 5 has a loading surface 513 which is disposed to extend forwardly of and transverse to the truck frame 2 for carrying objects 14 thereon, and a pivot portion 511 which is disposed rearwardly of the loading surface 513 and which is pivotably connected to the lower frame ends of the rails 21 below the base seat 24 about a pivot axis in the left-and-right direction to be turnable relative to the truck frame 2 between a folded position (see FIGS. 6 and 7), where the loading surface 513 extends parallel to the truck frame 2, and an unfolded position (see FIGS. 2 and 3), where the loading surface 513 extends transverse to the truck frame 2 and faces upwardly so as to cooperate with the truck frame 2 to define a carrying space 53.

The load measuring assembly 4 includes a force measuring unit 40 disposed on the truck frame 2 to receive and measure an upward force in the upright direction, and a force transferring unit 45 interconnecting the toe plate 5 and the force measuring unit 40 to transfer the weight of the objects 14 as the upward force to the force measuring unit 40.

Figure 7:
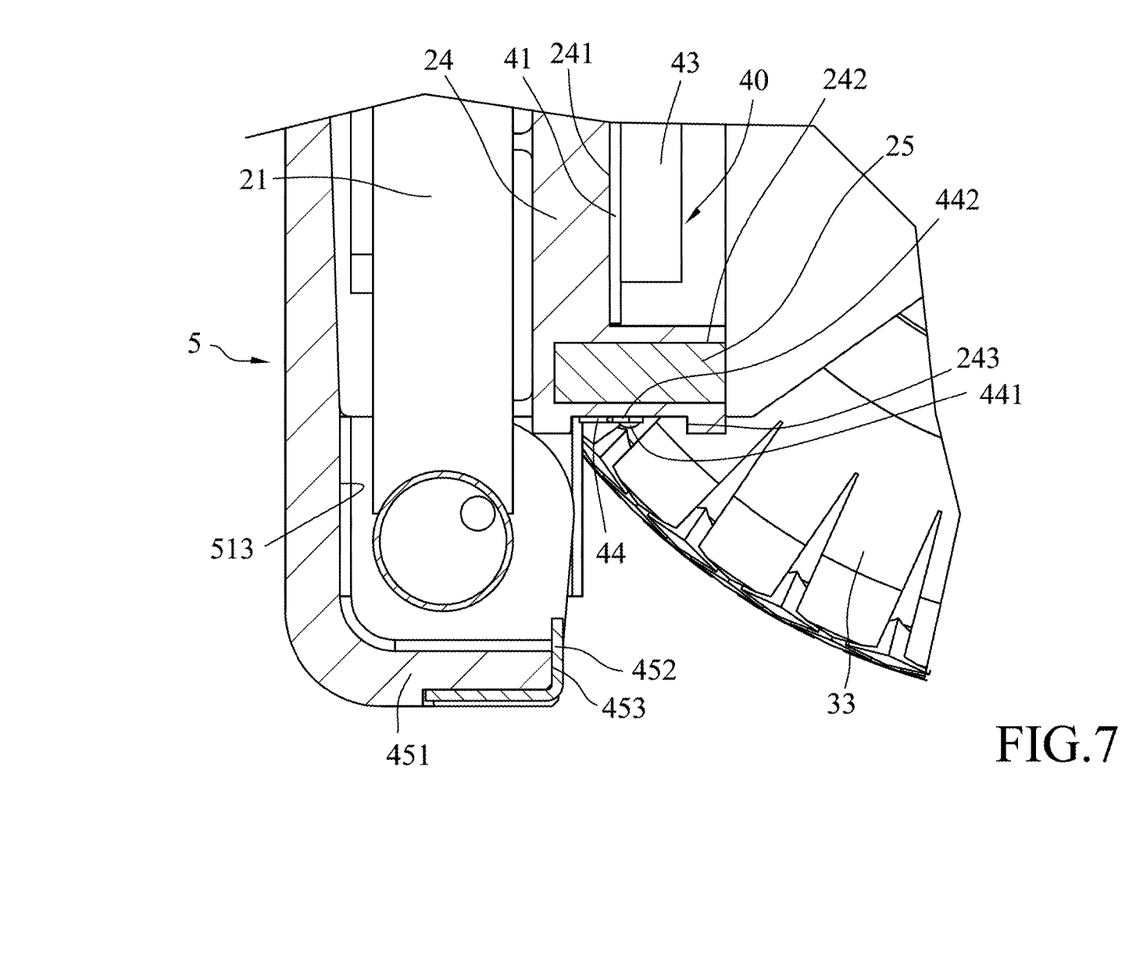
FIG. 7 is a fragmentary sectional view illustrating the toe plate in the folded position.

The force transferring unit 45 includes a force transmitting portion 451 which is integrally formed with the toe plate 5 and which extends transverse to the loading surface 513 to terminate at a mounting rim 453, and a contact portion 452 which is mounted on the mounting rim 453. The loading surface 513 and the force transmitting portion 451 are disposed at two opposite sides of the pivot axis. In this disclosure, the contact portion 452 is elongated in the left-and-right direction and has an L-shaped cross-section. Thus, when the toe plate 5 is in the folded position (as shown in FIG. 7), the mounting rim 453 of the force transmitting portion 451 faces rearwardly to bring the contact portion 452 remote from the force measuring unit 40. When the toe plate 5 is in the unfolded position (as shown in FIG. 3), the mounting rim 453 faces upwardly to bring the contact portion 452 into contact with the force measuring unit 40. At this stage, the weight of the objects 14 set on the loading surface 513 causes an upward movement of the force transmitting portion 451 and the contact portion 452 to apply the upward force to the force measuring unit 40.

The force measuring unit 40 includes a main board 41 disposed in the central recess 241 of the base seat 24 on which a circuit board 42 and two batteries 43 are mounted, and eight load cells 44 disposed in the bores 243 of the base seat 24 to confront and contact the contact portion 452 when the toe plate 5 is in the unfolded position. The batteries 43 may be rechargeable or the like to supply power to the circuit board 42 and the load cells 44. Each of the load cells 44 has a pressure sensing portion 441 at a center and an extending portion 442 extending from and surrounding the pressure sensing portion 441. Each load cell 44 is electrically coupled with the computing unit 7 through the circuit board 42 and wires (not shown). For example, the wires extend along one of the rails 21 to connect with the computing unit 7. Since the assembly of the wires and the construction of the load cells 44 are of a known type, a detailed description thereof is dispensed with herein.

Figure 8:
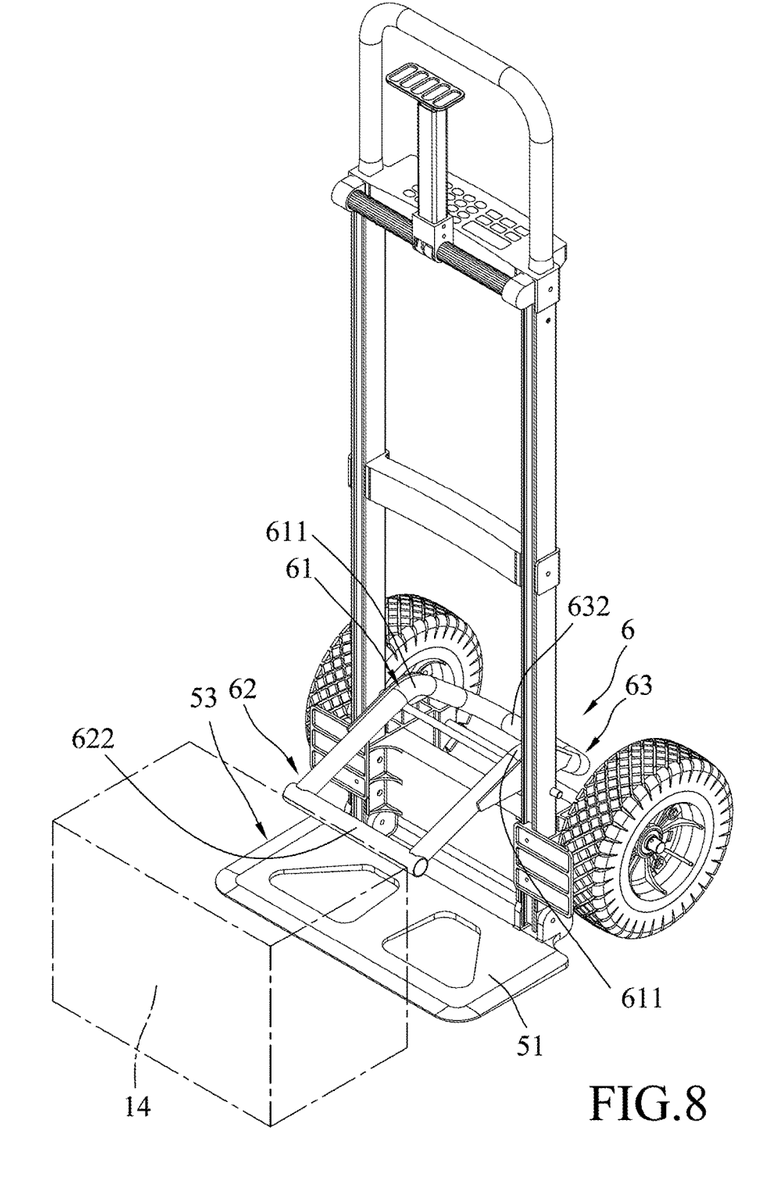
FIG. 8 is a perspective view illustrating a state where an unloading unit is in an unloading position.

The unloading unit 6 includes a pivoting frame 61 disposed inboard of the rails 21 and having two pivoting arms 611 which are pivotably connected with the rails 21 about a swing axis that is above the base seat 24, an unloading frame 62 extending forwardly and downwardly from the pivoting arms 611 to terminate at a weight crossbar 622, and an effort frame 63 extending rearwardly and upwardly from the pivoting arms 611 to terminate at a power crossbar 632. Hence, the unloading unit 6 is turnable from a non-operating position (as shown in FIG. 2), where the weight crossbar 622 and the unloading frame 62 are retracted in the space between the rails 21 and the power crossbar 632 projects rearwardly from the rails 21. When a treading force is applied to the power crossbar 632 to turn the unloading unit 6 to an unloading position (as shown in FIG. 8), the weight crossbar 622 and the unloading frame 62 are extended into the carrying space 53 to move the object 14 forwardly so as to permit the object 14 to be removed from the toe plate 5. By virtue of the unloading unit 6, the unloading operation is convenient and effortless.

The computing unit 7 is electrically connected with the load measuring assembly 4 to receive the signals generated in accordance with the upward force applied to the load cells 44 through the circuit board 42 and to produce digital output representative of summation of the signals. The computing unit 7 includes a display 71 for displaying the digital output and operating buttons 72 for converting units of the digital output and calculating the carrying fare. For example, by operating a button 72, the weight sum of the objects 14 can be converted from 60 kilograms to 132 pounds, and the weight sum of the objects 14 in either unit can be displayed on the display 71. Then, by operating another button 72 to key in the fare per kilogram, e.g. 10 dollars per unit, the carrying fare is calculated to be 600 dollars and is displayed on the display 71. By virtue of the computing unit 7, the weight of the objects 14 set on the toe plate 5 and a corresponding carrying fare can be computed and displayed without using additional calculating device and weighing scales.

Each of the load cells 44 has an upper measuring limit, such as 40 kilograms, such that the weighing range of this embodiment is 320 kilograms for example. The number of the load cells 44 may be varied for accommodating different requirements.

Figure 5:
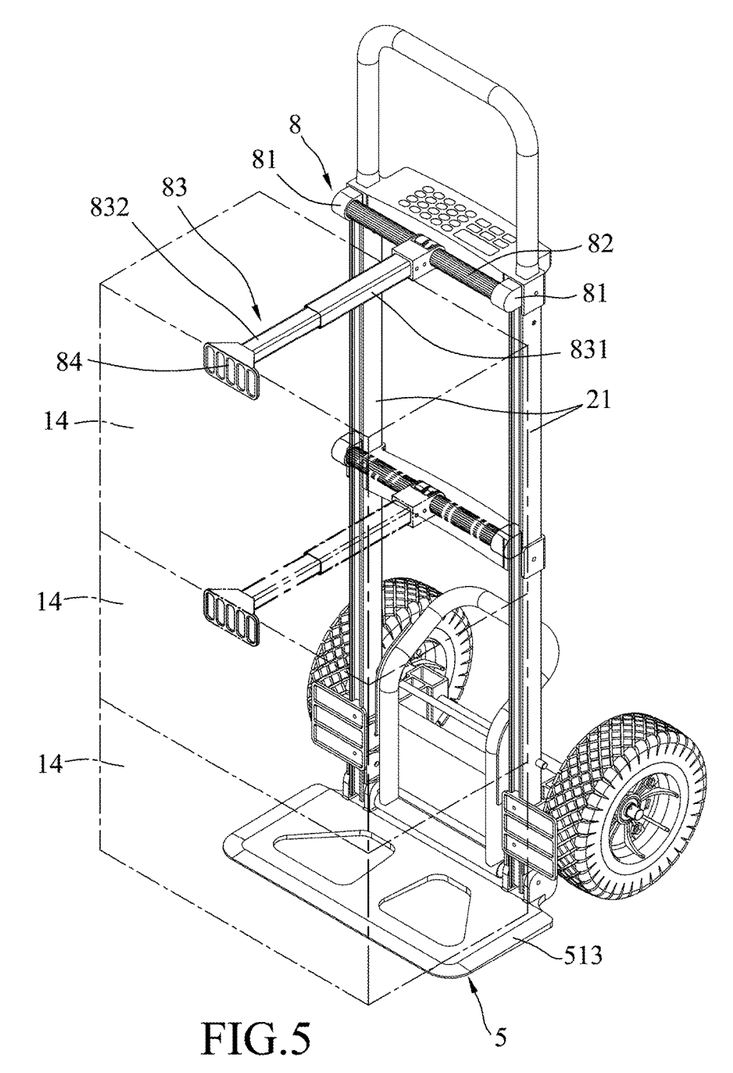
FIG. 5 is a perspective view illustrating a state where a retaining unit is in an extended position.

Referring to FIGS. 2, 3 and 5, the retaining unit 8 is disposed to retain the objects 14 in the carrying space 53, and includes a sliding rod 82 extending in the left-and-right direction to terminate at two end portions 81 that are slidable along the sliding grooves 211 of the rails 21, and a retaining rod 83 journalled on the sliding rod 82 at an end thereof. The retaining rod 83 has two rod segments 831, 832 telescopically fitted to each other, and a retaining head 84 disposed at a distal end thereof. Thus, the retaining rod 83 is moveable in the upright direction along with the movement of the sliding rod 82 to adjust the height thereof, and is turnable along the sliding rod 82 between a retracting position (see FIG. 2), where the retaining rod 83 extends uprightly and the rod segment 832 is retreated into the rod segment 831, and a retaining position (see FIG. 5), where the retaining rod 83 extends horizontally and the rod segment 832 is extended forwardly of the rod segment 831 so as to abut against an uppermost surface of the object 14.

As illustrated, by virtue of the force transferring unit 45 disposed at an opposite side of the loading surface 513 in terms of the pivot axis of the toe plate 5, the weight of the objects 14 set on the loading surface 513 can be transferred as an upward force to the load cells 44 of the force measuring unit 40. Since the objects 14 are not required to be directly loaded on the load cells 44, damage to the load cells 44 by the objects 14 is avoided.

While the disclosure has been described in connection with what is considered the exemplary embodiment, it is understood that this disclosure is not limited to the disclosed embodiment but is intended to cover various arrangements included within the spirit and scope of the broadest interpretation so as to encompass all such modifications and equivalent arrangements.

What is claimed is:

1. A hand truck comprising:

a truck frame extending in an upright direction to have upper and lower frame ends;

a toe plate having a loading surface which is disposed to extend forwardly of and transverse to said truck frame for carrying objects thereon, said toe plate being pivotably connected to said lower frame end of said truck frame about a pivot axis to be turnable relative to said truck frame between a folded position, where said loading surface extends parallel to said truck frame, and an unfolded position, where said loading surface extends transverse to said truck frame and faces upwardly; and a load measuring assembly disposed on said truck frame adjacent to said toe plate and spaced apart from said loading surface to measure weight of the objects set on said loading surface, said load measuring assembly including a force measuring unit disposed on said truck frame to receive and measure a force in the upright direction, and a force transferring unit interconnecting said toe plate and said force measuring unit to transfer the weight of the objects as the force to said force measuring unit, said force transferring unit including a force transmitting portion which extends transverse to said loading surface to terminate at a mounting rim, and a contact portion which is mounted on said mounting rim, said loading surface and said force transmitting portion being disposed at two opposite sides of the pivot axis such that, when said toe plate is in the folded position, said mounting rim of said force transmitting portion faces rearwardly to bring said contact portion remote from said force measuring unit, and such that, when said toe plate is in the unfolded position, said mounting rim faces upwardly to bring said contact portion into contact with said force measuring unit, and the weight of the objects set on said loading surface causes an upward movement of said force transmitting portion and said contact portion to apply an upward force to said force measuring unit.

2. The hand truck as claimed in claim 1, wherein said force measuring unit has a plurality of load cells placed to confront and contact said contact portion when said toe plate is in the unfolded position.

3. The hand truck as claimed in claim 2, wherein said force measuring unit has a battery disposed to supply power to said load cells to generate a plurality of signals in accordance with the upward force applied to said load cells.

4. The hand truck as claimed in claim 3, further comprising a computing unit disposed to receive the signals from said load cells and produce digital output representative of summation of the signals.

* * * * *